2,733,236

AZO DYESTUFFS DERIVED FROM DEXTRAN

Harry A. Toulmin, Jr., Dayton, Ohio, assignor to The Commonwealth Engineering Company of Ohio, Dayton, Ohio, a corporation of Ohio No Drawing. Application May 12, 1953, Serial No. 354,650

7 Claims. (Cl. 260—152)

This invention relates to new azo dyestuffs derived from dextrans or dextran derivatives.

The dextrans are a distinct class of high molecular weight branched polysaccharides made up of anhydroglucopyranosidic units linked by molecular structural repeating linkages some, and apparently at least 50% of which, are alpha-1,6 linkages.

In accordance with the invention it is found that azo dyestuffs which exhibit fastness to light, washing and perspiration can be derived from dextran or dextran-amino conversion products, for example by coupling a diazotized amino-aromatic compound with the dextran, or by treating the dextran-amino conversion product or an appropriate salt thereof with a diazotizing agent and then coupling the diazotized product with an aromatic compound.

Thus, an amino aromatic compound such as aniline may be diazotized by means of sodium-nitrite, and the diazotized aniline may then be coupled with dextran, or an amino-benzoic acid ester or ether of dextran, or a salt thereof, may be treated with sodium nitrite and the resultant diazo product coupled with an aromatic compound.

When amino-benzoic acid esters or ethers are used as starting material they may be prepared by reduction of the corresponding nitro-benzoic acid esters or ethers. These latter may be prepared by reacting alkali dextran with a nitro aromatic chloride or a nitro aralkyl chloride, or by reacting the alkali dextran with an aromatic acid chloride to produce an ester or ether which is then nitrated. The nitration may be performed, for example, in a solution of the ester or ether in an organic solvent inert to aromatic nitration, or in a suspension of the ester or ether, a suitable nitrating medium being, for instance, a mixture of approximately equal parts of concentrated sulfuric and nitric acids.

In general, the proportions are selected so that, in the final products, there is an average of at least one N=N group per anhydroglucopyranosidic unit of the dextran.

The properties of the dextrans, including the extent of branching (the number and distribution of side groups or chains), the molecular structural repeating alpha-1,6 to alpha-non-1,6 linkages ratios, the water-sensitivity, and the osmotic pressure in liquids vary. The dextrans used in practicing the present invention may be water-soluble or water-insoluble.

The dextran may be produced in any suitable way. Thus, it may be obtained by inoculating a nutrient medium containing sucrose, particular nitrogenous compounds and certain inorganic salts with an appropriate microorganism, such as those of the *Leuconostoc mesenteroides* or *L. dextranicum* types and incubating the culture at the temperature most favorable to the growth of the microorganism.

In one method of obtaining dextran to be used in producing the dyestuffs of the invention there is first prepared an aqueous nutrient medium which may have the following composition:

| | Percent by weight |
|---|---|
| Sucrose | 20 |
| Corn steep liquor | 2 |
| Monobasic potassium phosphate | 0.5 |
| Manganous sulfate | 0.002 |
| Sodium chloride | 0.50 |
| Water | Balance |

This medium is adjusted to a pH of between about 6.5 and about 7.5, preferably 7.2, and then sterilized. The material is cooled to room temperature and inoculated with a culture of the dextran-producing bacteria, for example, *Leuconostoc mesenteroides* B-512 (Northern Regional Research Laboratory Classification) and incubated at 20° to 30° C. (optimum 25° C.) until a maximum yield of dextran has been attained; normally a period of between 12 and 48 hours will be satisfactory for this procedure. The fermented product contains approximately 80–85% of water and is a thick turbid liquid.

Upon completion of the fermentation, which process renders the material somewhat acid, that is, to a pH of 3.5–5.5 (average 4.2), calcium chloride is added to the ferment to bring the pH thereof to about 7.0 to 8.0. This aids in the precipitation of phosphates. Thereafter, acetone or alcohol, which may be a water-miscible aliphatic, such as methyl, ethyl, or isopropyl, is added in sufficient quantity to precipitate the dextran and this brings down, with the dextran, occluded and adsorbed bacteria, and nitrogenous and inorganic elements. To occasion complete precipitation of the dextran it may be desirable to allow the mix to stand for a relatively long period, such as about 6 hours. The precipitated dextran may be dried in any suitable manner, for example by drum drying. Thereafter, it may be reduced to particulate condition. The dextran may be spray-dried, or a dried powder may be obtained by subjecting the dextran to lyophilization. The dextran may be used in powder form or in the form of larger aggregates. It may even be used in the gum form, if desired.

A purer dextran may be obtained by adding an aliphatic alcohol to the fermented culture at a pH between about 2.5 and 4.5. The precipitate thus obtained may be further purified by again precipitating it with the alcohol. Several precipitations may be performed.

The dextran thus produced is a so-called "native" dextran having a high molecular weight which is calculated to be in the millions, and in the particular case, is soluble in water at ordinary temperatures. These "native" high molecular weight dextrans produced as described, or dextrans of equivalent high molecular weights produced under other conditions, may be coupled with the diazotized aromatic, such as aniline, or esterified or etherified with the aromatic nitro-carbocyclic compounds. Also, dextrans of lower molecular weight may be used. For instance, a high molecular weight dextran may be hydrolyzed in any suitable manner, to lower molecular weight. For instance, the dextran may be obtained by hydrolyzing the initially high molecular weight dextran obtained as described above to a product having a molecular weight or average molecular weight in the range between 20,000 and 100,000, and the hydrolyzed product may be fractionated to obtain a fraction of uniform or more nearly uniform molecular weight. Such fraction may be treated by known methods for the removal of pyrogens and coloring materials. The dextran may be a so-called "clinical" dextran such as may be used as a blood plasma extender. In general the dextran may have a molecular weight between 5000 and $50 \times 10^6$, as determined by light scattering measurements.

The dextran may be obtained by inoculating the culture medium with microorganisms other than that mentioned above. Thus it may be a water-soluble dextran obtained by the use of the microorganisms bearing the following NRRL classifications: *Leuconostoc mesenteroides* B–119, B–1146, B–1190, or a water-insoluble or substantially water-insoluble dextran obtained by the use of *Leuconostoc mesenteroides* B–742, B–1191, B–1196, B–1208, B–1216, B–1120, B–1144, B–523, *Strepobacterium dextranicum* B–1254 and *Betabacterium vermiforme* B–1139.

The dextran is not limited to one prepared under any particular set of conditions, including the microorganism used. It may be produced enzymatically, in the substantial absence of bacteria, by cultivating an appropriate microorganism, for example, *Leuconostoc mesenteroides* B–512 to obtain a dextran-producing enzyme, separating the enzyme from the medium in which it is produced, and introducing the enzyme into a medium in which dextran is produced by the action of the enzyme. Also, the dextran may be obtained by bacterial conversion of 1,4 linkages of dextrin to 1,6 linkages of dextran.

The following examples are illustrative of specific embodiments of the invention.

*Example I*

A slurry is prepared comprising 0.1 mol of aniline in water to which is added 0.25 mol of hydrochloric acid. The mixture is diluted with about 3 parts by weight of water and cooled to a temperature of between about 0–15° C.

While maintaining the temperature of the mixture at about 10° C. there is added slowly over a period of about 10 to 15 minutes 0.1 mol of sodium nitrite. The mixture is stirred slowly while maintaining the temperature at about 10° C. for one-half hour.

The diazotized aniline thus prepared is coupled with dextran having an average molecular weight in the range of 70,000 to 85,000 by adding 0.3 mol of dextran in water. The mixture is diluted with water and cooled to between 5° C. and 10° C. Thereafter the diazotized aniline medium is stirred into the dextran slurry over a 15 minute period, while maintaining the temperature at about 10–15° C. and the pH of the solution above 9.0. After stirring the mixture for an additional half-hour, the dextran-azo dyestuff is isolated by adjusting the pH of the solution to neutral with dilute hydrochloric acid and adding sodium chloride to it to precipitate the dextran-azo dyestuff complex from the solution. The complex is recovered by filtration.

Instead of precipitating the complex from the neutral medium by means of sodium chloride, other inorganic salts may be used for the purpose, such as, for instance, sodium sulfate.

The reaction is independent of the molecular weight and dextrans of molecular weights between 5000 and $50 \times 10^6$ may be used.

*Example II*

Example I is repeated except that the dextran-azo dye complex is formed directly in a fermentate containing the "native" dextran produced by incubation of a sucrose-containing medium as described herein with microorganism *Leuconostoc mesenteroides* B–512, which had been adjusted to a pH of about 9.0 and the coupling reaction is carried out by adding the diazotized aniline medium to the fermentate. The dextran-azo dye complex is then precipitated from the fermentate by means of alcohol or acetone, separated by filtration, and washed to remove extraneous matter precipitated from the fermentate with it.

*Example III*

Example I is repeated except that the coupling is effected by adding diazotized 1-naphthylamine-4-sulfonic acid to an aqueous slurry of methyl dextran (obtained by reacting the dextran with methyl sulfate in the presence of sodium hydroxide). Diazotized 2-amino-8 naphthol sulfonic acid and p-nitroaniline may also be used.

*Example IV*

About 10 parts by weight of a finely divided p-nitrobenzoic acid ester of a dextran having an average molecular weight of about 70,000 to 85,000 are mixed with 80 parts by volume of normal sodium hydrosulfide solution, and the mixture is heated on a water bath at a temperature of 60° C. to 70° C. for about an hour, with vigorous stirring. The yellowish amino compound thus produced is filtered off and washed, after which it is mixed with about 50 parts by volume of dilute sulfuric acid (10 parts by volume of conc. sulfuric acid plus 50 parts by volume of water). That mixture is heated on the water bath at a bath temperature of 70° C. for from 15 to 30 minutes, with stirring. It is then cooled, and a solution of 4 parts by weight of sodium nitrite in 16 parts by volume of water is added, preferably slowly, and with continuous, vigorous stirring, the temperature of the mass being maintained at about 8° C. and, if necessary, with the addition of ice. The mass comprising the diazo suspension is gradually added to a solution of about 9.2 parts by weight of B-naphthol dissolved in 165 parts by volume of a 2N sodium hydroxide solution. This coupling solution becomes brown-red in color. After completion of the addition of the diazo suspension, stirring is continued for from thirty minutes to an hour. The solution is filtered and, after thorough washing with water, the product is a finely divided solid dyestuff of orange shade.

The dextran-p-nitrobenzoic acid ester used in Example IV may be replaced by dextran-p-nitrobenzyl ether, which may be converted to the azo dyestuff substantially as set forth in the example, to obtain a stable ether dyestuff.

Also, the para-nitro compound used may be replaced by the ortho- and meta-nitro benzoic acid ester or benzyl ether. Mixed esters and ethers may be used, such as dextran acetate-nitrobenzoate, dextran nitrate-nitrobenzoate, dextran ethyl ether-nitro-benzoate, dextran-acetate-nitro benzyl ether, dextran nitrate-nitro benzyl ether, dextran ethyl ether-nitro benzyl ether, and homologues thereof.

*Example V*

About 2 parts by weight of the dextran p-amino benzoic acid ester of Example IV is treated with 10 parts by volume of a dilute sulfuric acid solution as in Example IV, and heated for from thirty minutes to one hour on a water bath having a temperature of 70° C. The mixture is cooled, and about 2 parts by weight of sodium nitrite in 8 parts by volume of water is added slowly with vigorous stirring, while maintaining the temperature at about 6°. Stirring at the reduced temperature is continued for about 30 minutes longer, and the diazo solution thus obtained, maintained in the cool condition, is added gradually to a vigorously stirred solution of 4.0 parts by weight of 4-amino-5-hydroxy-2, 7-naphthalene disulphonic acid in 57 parts by volume of 2N sodium hydroxide solution. Stirring of the mixture is continued for about one hour, during which the solution becomes dark purple in color. It is filtered, and after washing, the azo dyestuff is obtained as a particulate solid which is lilac in shade.

*Example VI*

About 2 parts of dextran p-amino benzoic acid ester or ether as in Example IV, is heated with sulfuric acid, cooled, and diazotized as in Example IV. The diazo suspension is added gradually to a vigorously stirred solution of 2.7 parts by weight of salicylic acid in 9.5 parts by weight of a solution obtained by dissolving 9.5 parts of soda in 40 parts by volume of water. Stirring is continued for about an hour, during which the solution becomes dark yellow. It is filtered and the product remaining on the filter is washed thoroughly to obtain the azo dye as a particulate solid of yellow color.

Example VII

About 4.0 parts by weight of 4-amino-5-hydroxy-2,7-naphthalene disulphonic acid are dissolved in a solution of 3 parts by weight of soda ($Na_2CO_3H_2O$) in 35 parts by volume of water. The solution which is alkaline, is cooled, with the addition of ice, and diluted hydrochloric acid solution is added to it until it becomes slightly acid when tested with Congo paper. A diazo solution of 2.1 parts by weight of p-nitroaniline is prepared by dissolving the p-nitro-aniline in 5.5 parts by volume of a diluted hydrochloric acid (15 parts by volume of conc. HCl plus 20 parts by volume of $H_2O$), and adding the same rapidly to a mixture of 45 parts by weight of ice, 30 parts by volume of water, 1.5 parts by volume of conc. HCl and 7.6 parts by volume of a solution of 1.4 parts by weight of sodium nitrite in 10 parts by volume of water. The diazotized nitroaniline solution is then gradually added to the 4-amino-5-hydroxy-2,7-naphthalene disulphonic acid. Stirring is continued for about 1 hour, during which period a diluted sodium acetate solution is added to buffer the mix. After completion of the reaction, the dark red-colored coupling solution is made alkaline by the addition of soda. A diazo suspension produced from 2 parts by weight of the dextran p-aminobenzoic acid ester or ether diazotized as in Example IV, is gradually added to the alkaline coupling solution, with stirring which is continued for 1.0 to 2.0 hours after the addition of the diazo suspension has been completed. The solution is filtered, and the particulate dyestuff, after thorough washing, has a dark blue color.

It will be observed that, in the modification of Example VII, introduction of the second azo group produces a bathochrome or chromophore effect and modifies the color of the final dyestuff.

Certain variations may be made in practice. Thus, in the embodiments illustrated in Examples I–III, instead of coupling diazotized aniline with the dextran, there may be used diazo derivatives of other such amino compounds as 1-naphthylamine-4-sulfonic acid and 2-amino-8-naphthol sulfonic acid. In the embodiments of Examples IV–VII, instead of diazotizing the dextran amino derivative and coupling it with an appropriate coupling agent, the dextran molecule may be esterified or etherified with an aromatic system or compound which is itself a coupling agent for diazotized materials. Thus, the dextran may be esterified with salicylic acid and the salicylate may then be treated with a diazo solution such as a solution of p-nitroaniline.

Also, the dextran may be combined in ether or ester relation with an A or B-naphthyl carboxylic acid and similar substances.

It will be understood that the conditions under which the new products are produced may be varied. For example, when the starting material is a particulate nitrobenzoic acid ester of dextran which is converted to the corresponding amino compound which is, in turn, heated with acid on the water bath to form a salt of the amino ester or ether prior to the diazotization, the time for heating required to complete the salt formation will depend on the size of the particles, the finer the particles the less time required for completion of the salt-forming reaction. Time and temperature variations may also be made in effecting the diazotization of the aniline or the like or of the dextran amino benzoic acid salt, as well as in carrying out the coupling reaction. As shown in the examples, the coupling may be carried out under alkaline conditions and alkali, in the form of sodium hydroxide or alkali carbonate may be added to the coupling medium or solution. When the coupling is effected under acid conditions, the coupling solution may be maintained slightly acid and a buffering agent may be added, if desired, to assist in controlling the acidity.

The new colored products or dyestuffs may be marketed in the form of pastes or suspensions, as loose particulate masses, or in the form of solutions. They may be used in dyeing a wide variety of materials by the conventional techniques employed in dyeing processes involving the use of dyestuffs of the diazo class. The invention provides these new dyestuffs which are all of the diazo type and in which the dye is combined with dextran or a suitable dextran derivative or conversion product and adapted to be selected for dyeing particular materials. The new dyestuffs may contain both auxochrome and chromophore groups of the type of OH and $SO_3H$ groups (introduced as constituents of the coupling agent or in an after-treatment, e. g., by sulphonation) and be selectively adapted or "tailored" to use in dyeing fibers or fibrous products and fixed thereon. Or the dyestuffs may be free of auxochrome groups for use as pigments in varnishes, lacquers, woodstains and the like.

Those coloring materials of the invention which are obtained by coupling diazotized aniline or the like with dextran are soluble in water and are particularly useful in woodstaining compositions, which may be prepared, for example, by dissolving a suitable amount of the azo dyestuff, such as 10% by weight, in water, to obtain a staining solution applicable to a wood base by brushing or spraying. The amount of dye utilized in any given application will depend on the dye and the depth of color required for the particular stain.

In preparing woodstaining compositions, it is within the scope of the invention to compound the dye with solvent and vehicle ingredients other than water, such other solvents and vehicles being selected for relative inexpensiveness and commerical practicality. They should be solvents of or miscible with the dextran dye dissolved in the penetrant vehicle component, and should be of such nature as to penetrate the wood and carry the dye into the wood. Further, the composition should desidably include a water eliminant in order to give the composition properties of resistance to moisture retention. Further, the combination of solvents or diluents or vehicles should be such that the final composition exhibits a proper evaporation curve to dispel both the diethylene-gylcol mono-ethyl ether or other pentrant vehicle and any moisture present from the wood surface.

As illustrative of ingredients that may be utilized in order to increase the rapidity of drying and setting of the composition, the aliphatic alcohols, such as methyl alcohol, ketones, such as acetone, and the esters of the aliphatic alcohols, particularly the fatty acid esters of such materials, namely ethyl acetate, etc. may be utilized. Methyl alcohol or methanol is a particularly valuable ingredient for use in this connection.

Ingredients that give the composiiton resistance to moisture retention include hydrocarbon distillates, particularly the coal tar distillates, benzol, toluol, solvent naphtha, the xylols, ethyl benzene, etc. Toluol is valuable in this connection. Many of the esters, such as butyl propionate and butyl acetate are also exemplary of materials which have water eliminating properties, but such materials as these esters are slower drying and cost more, and therefore, are not as valuable in general in compositions of the present character as are the hydrocarbon substances, such as toluol. Both the aliphatic alcohols and similar ingredients and the hydrocarbon distillates and similar ingredients aid in the penetration and evaporation and other desirable effects above mentioned.

A modified wood staining composition may be made using composite solvents, such as follows, the parts being by weight:

| | Parts |
|---|---|
| Diethylene-gylcol mono-ether | 1–5 |
| Methyl alcohol | 8–10 |
| Toluol | 4–6 |

This composition may be utilized with, for example, from 2 to 10 ounces of the appropriate dextran-azo dye to one gallon of the composite solvent. Diethyleneglycol mono-ethyl-ether is a particularly good penetrant vehicle component and may be used with these dextran-azo dyes to produce a wood stain. Mono butyl ether of diethylene glycol may also be used for this purpose.

While for the production of stain compositions, particularly for treating wood surfaces, the compositions hereinabove described may be utilized, other ingredients may be added to the composition for particular purposes. For example, fillers, such as silex, or oil paste fillers, may be mixed with the new stain composition to make a combination stain and filler. A combination dextran-azo stain and filler having a color that is fast to light may, accordingly be produced.

In addition, the dextran-azo dye stains produced in accordance with this disclosure, or the stain bases, may be added to or incorporated with cellulose ester or ether solutions and lacquers, as well as other lacquers, particularly those containing solvents of the nature of alcohols and hydrocarbons. In this way color dipping lacquers, the color of which is fast, may be produced. Various types of nitrocellulose compositions may be combined with the stain bases or compositions of the present invention.

This invention provides, for the first time, azo dyestuffs combined with dextran or dextran derivatives, which may be soluble or dispersible in water and which may be advantageously employed in dyeing all manner of materials and in the preparation of water stains which, after application to wood, in hot or cold solution or dispersion, are substantially fast to light, exhibit non-fading non-grain raising properties, and do not tend to bleed through lacquer or varnish top finishing coats so that intermediate sealing coats are not necessary. Such intermediate sealing coats are not required. Hot aqueous solutions or dispersions of the dextran azo dyes, such as those derived from aniline, penetrate into the pores of wood and the solvent evaporates before the grain of the wood is raised. Upon cooling, the dye is "set" in the wood and forms a relatively smooth uniformly stained wood surface. The thus stained surface may be sanded or otherwise treated to produce a desirable surface upon which a finish coating of varnish or lacquer may be applied.

In utilizing the appropriate dextran azo dyestuffs of this invention in the preparation of woodstaining compositions, it is within the scope of the invention to include in the compositions, from 1 part to 1,000 parts per 10,000 parts of the dye, of materials which enhance the optical brightness of the stain, such as the various umbelliferone compounds. If desired, substances may be incorporated in the woodstaining compositions which are luminescent in sunlight and increase the brilliancy of the color. Other compatible water-soluble dyes or pigments may be incorporated in woodstaining compositions comprising the dextran-azo dye from aniline or the like, and in amounts up to 10% of the weight of the latter, for special purposes such as for assisting in controlling the depth of the stain, the grain development, and the shade of the grain.

In so far as woodstaining is concerned, it is within the scope of the invention to include in the stain the so-called "optical brighteners" which are also sometimes referred to as "bleaches" and operate on the principle of converting ultraviolet or near ultraviolet light into a blue or near blue light. Such substances serve as brighteners, whitening agents, optical bleaches and as screening media for ultraviolet radiation. Those substances are characterized by fluorescence and are capable of masking the normal yellowish or brownish characteristics of cellulose and of producing contrasts between different colors and different hues or shades thereby emphasizing the design as in the case of the grain of the wood which is colored differently by the stains and fillers than is the remainder of the wood.

It has been a problem to select the colorless dyes or optical brighteners so that they would not conflict with the previously used aniline dyes of the known non-grain-raising stains or with the known oil-soluble wood stains when the latter have been used. It has also been a problem to find a brightener having the property of substantivity with respect to both the known water-soluble aniline stains and to the cellulose of the wood. The present invention has the advantages that the optical brighteners are compatible with the dextran-azo dyes and substantive to those dyes and to the cellulose of wood.

This solves preplexing problems which have existed up to now in the woodstaining art. Heretofore, the problem has been two-fold: first, the tendency of the wood finish to age in sunlight, causing it to darken and the wood grain to lose its definition, depth, etc. On dyeing, previously, the contrast between the grain and the rest of the wood was lost, with acquisition by the wood of a uniform, dull, dark color. Secondly, in the past, using the known wood staining compositions, it was difficult to avoid over-finishing the wood. The multiple treatments required, such as filling, staining, sealing, lacquering, rubbing and polishing built up, at the beginning of the life of the wood, a handsome appearance. However, as the wood aged, these multiple coatings also aged, becoming dull and dulling the finish of the wood.

By the use of the woodstaining compositions comprising dextran-azo dyestuffs in accordance with this invention, and more particularly those compositions comprising the optical brighteners, there is obtained a marked improvement in the initial appearance of the wood, and a prolongation of the original appearance over a long period of time. These compositions bring out the grain of the wood and impart to it a luminescent glow in sunlight which greatly enhances its beauty and quality. Moreover, although the brightener may be applied to the wood prior to these woodstaining compositions, if desired, the compatibility of those agents which are optical brighteners with the present dextran-azo dyestuffs permit of incorporating the brighteners in the staining composition, so that only one application is required to achieve both the staining and brightening effects.

The agents which are known to be optical brighteners are usually water-white and transparent materials which do not influence the actual color of the stained wood, or of the filler.

Among the optical brighteners, i. e., colorless, fluorescent dyes having an affinity for cellulose, which may be used in conjunction with staining compositions comprising the azo dyestuffs derived from dextran or dextran conversion products are coumarin derivatives, stilbene derivatives, benzimidazoles, and derivatives of amino-naphthalene. Typical are hydroxy-coumarin, 4-methyl-7-diethylamino coumarin, the umbelliferones such as B-methyl-umbelliferone (a methyl-substituted hydroxy-coumarin), the umbelliferones marketed by Ciba Company, Inc., under the names "Unitex" WS and "Unitex" RS, and the umbelliferone marketed by General Aniline and Film Corporation as "Paper White RB"; styryl benzimidazoles such as 2-styrylbenzimidazole and the products marketed by General Dyestuff Company as "Blancaphor" SC and "Blancaphor" R; 1-(m - acetamido -2 - benzimidazole) - 2-(p - acetamidophenyl) ethylene, and 2,2'-ethylene-bis (1-benzylbenzimidazole); o-alkoxy-benzoyl derivatives of 4,4'-diaminostilbene-2,2'-disulfonic acid, optical; 1-naphthylamino-4-sulfonic acid, sodium 2-naphthylamino-6,8-disulfonate and triazine condensation products.

These brighteners may be selected on the basis of the composition of the woodstaining preparation including the solvents present therein. Thus, B-methyl umbelliferone is normally compatible with such solvents as isopropanol and acetone, soluble in alcohols, ethers and esters, and slightly soluble in water. The product "Unitex" WS is soluble in alcohols, ethers, lacquer thinners and water, while "Unitex" W concentrate is soluble in ethers, esters such as acetates, alcohols, ring hydrocarbons and water. The highly concentrated product. "Blancaphor" SC is soluble in ethers and slightly soluble in alcohol, and that known as "Blancaphor" R is slightly soluble in ethers, alcohols, and esters.

The optical brighteners or colorless fluorescent dyes marketed by General Dyestuff Company under the names "Floral" OB–cc–O–124 and 7 GA are also very useful.

The colorless dye or brightener may be selected so that it is soluble in or miscible with the solvents of the woodstaining composition.

It may be stated that, of the umbelliferone brighteners mentioned herein, the most satisfactory are "Unitex" WS, "Unitex" RS and "Paper White" RB.

As previously indicated, the dyestuffs which are usually incorporated in the woodstaining compositions are those obtained by coupling the diazotized aromatic with a dextran or dextran conversion product such as methyl dextran, ethyl dextran, carboxyalkyl dextran, etc., and which may not contain auxochrome groups. However, the dyestuffs containing both auxochrome and chromophore groups, such as those shown herein as obtained by treating the diazotized dextran amino conversion product with a coupling agent, may also be used in woodstaining compositions or in dyeing natural and synthetic or artificial fibers and fabrics, knitted, woven, or non-woven, comprising such fibers and yarns.

Instead of dextran there may be used dextran derivatives including dextran esters, dextran ethers, dextran mixed esters, dextran mixed ethers, and dextran ester-ethers. Examples of dextran derivatives which may be used are described in U. S. Patents 2,203,702–5 to G. L. Stahly, et al. and in U. S. 2,344,190 to Waldie et al.

These new dyestuffs may be regarded as having the general formula

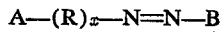

in which A is the molecule of a dextran or dextran derivative as described herein, R is the benzoyl or benzyl radical, x is an integer from 0 to 3, N is nitrogen and B is an aromatic group, the dyestuff containing an average of at least one —N=N— group for each anhydroglucopyranosidic unit of A.

These dyestuffs are different from the azo dyestuffs which may be derived from cellulose, due to the more or less highly branched structure of the dextrans. They also differ in that, unlike cellulose, the dextrans vary with respect to their solubility in water and by appropriate selection of the dextran it is possible to influence the solubility of the dyestuff.

Since the modifications specifically mentioned, and others, may be made without departing from the spirit and scope of the invention, it is to be understood that the invention is not to be limited except as defined in the appended claims.

I claim:
1. An azo dyestuff of the general formula

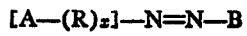

in which A represents the molecule of a substance selected from the group consisting of dextran, lower acyl esters of dextran, lower alkyl ethers of dextran, benzyl dextran and dextran nitrate, R is selected from the group consisting of the benzoyl and benzyl radicals, x is an integer from zero to three, and B is selected from the group consisting of aniline, B-naphthol, 1-naphthylamino-4-sulfonic acid, 2-amino-8-naphthol sulfonic acid, 4-amino-5-hydroxy-2,7-naphthalene-disulfonic acid and salicylic acid.

2. An azo dyestuff of the general formula

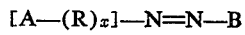

in which A represents the molecule of dextran, R is selected from the group consisting of the benzoyl and benzyl radicals, x is an integer from zero to three, and B is selected from the group consisting of aniline, B-naphthol, 1-naphthylamino-4-sulfonic acid, 2-amino-8-naphthol sulfonic acid, 4-amino-5-hydroxy-2,7-naphthalene disulfonic acid and salicylic acid.

3. An azo dyestuff having the formula

in which A represents the molecule of dextran and B represents aniline.

4. An azo dyestuff having the formula

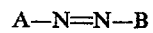

in which A represents the molecule of methyl dextran and B represents 1-naphthylamino-4-sulfonic acid.

5. An azo dyestuff having the formula

in which A represents the molecule of dextran, R represents the benzoyl radical, and B represents B-naphthol.

6. An azo dyestuff having the formula

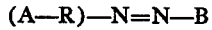

in which A represents the molecule of dextran, R represents the benzyl radical, and B represents B-naphthol.

7. An azo dyestuff having the formula

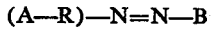

in which A represents the molecule of dextran, R represents the benzoyl radical, and B represents 4-amino-5-hydroxy-2,7-naphthalene disulfonic acid.

References Cited in the file of this patent

UNITED STATES PATENTS 2,136,377    Dinklage _____ Nov. 15, 1938

OTHER REFERENCES

Scherer et al.: "Rayon Textile Monthly," September 1944, pp. 123 (461).

Pigman et al.: "Carbohydrate Chemistry," 1948, page 513.